(12) United States Patent
Viola

(10) Patent No.: US 7,469,531 B2
(45) Date of Patent: Dec. 30, 2008

(54) METHOD AND APPARATUS TO CONTROL INJECTION OF A REDUCTANT INTO AN EXHAUST GAS FEEDSTREAM

(75) Inventor: Michael B. Viola, Macomb Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 92 days.

(21) Appl. No.: 11/533,431

(22) Filed: Sep. 20, 2006

(65) Prior Publication Data
US 2008/0066455 A1 Mar. 20, 2008

(51) Int. Cl.
*F01N 3/00* (2006.01)

(52) U.S. Cl. .............. 60/286; 60/274; 60/276; 60/297; 60/301; 60/303

(58) Field of Classification Search ............ 60/274, 60/276, 286, 295, 297, 301, 303
See application file for complete search history.

(56) References Cited

U.S. PATENT DOCUMENTS

| | | | | |
|---|---|---|---|---|
| 4,854,123 | A * | 8/1989 | Kobayashi et al. | ............ 60/274 |
| 5,586,433 | A | 12/1996 | Boegner et al. | |
| 5,606,856 | A | 3/1997 | Linder et al. | |
| 5,727,385 | A | 3/1998 | Hepburn | |
| 6,284,211 | B1 | 9/2001 | Miyadera et al. | |
| 6,295,809 | B1 * | 10/2001 | Hammerle et al. | ............ 60/286 |
| 6,311,484 | B1 | 11/2001 | Roth et al. | |
| 6,546,720 | B2 * | 4/2003 | van Nieuwstadt | ............ 60/286 |
| 6,742,330 | B2 * | 6/2004 | Genderen | ............ 60/286 |
| 6,805,849 | B1 | 10/2004 | Andreasson et al. | |
| 7,000,383 | B2 | 2/2006 | van Nieuwstadt et al. | |
| 7,086,223 | B2 * | 8/2006 | Itoh et al. | ............ 60/286 |
| 2004/0170548 | A1 | 9/2004 | Johnston Bartley et al. | |
| 2005/0002843 | A1 | 1/2005 | Kim et al. | |
| 2005/0091967 | A1 | 5/2005 | Sisken | |
| 2006/0029535 | A1 | 2/2006 | Ott | |
| 2006/0075742 | A1 | 4/2006 | Lee | |

OTHER PUBLICATIONS

Shelef, M.,Selective Catalytic Reduction of NOx with N-Free Reductants, Chem. Rev., 1995, pp. 209-225, vol. 95, American Chemical Society, USA.
Twigg, Martyn V., Automotive Exhaust Emissions Control, Platinum Metals Rev., 2003, 47,(4), pp. 157-162.
Kass, Michael D., et al., Selective Catalytic Reduction of Diesel Engine NOx Emissions using Ethanol as a Reductant, US Doe 9th Deer Conf., Newport, RI, Aug. 2003, pp. 1-9.
West, Brian, et al., In-Cylinder Production of Hydrogen during Net-Lean Diesel Operation, SAE Tech Paper, Apr. 2006, 2006-01-0212, SAE Warrendale, PA.

* cited by examiner

*Primary Examiner*—Binh Q. Tran

(57) ABSTRACT

A method and apparatus to control injection of a reductant into the exhaust gas feedstream of an internal combustion engine adapted to operate in a lean air/fuel ratio region upstream of a catalytic reactor device is provided. A control module is operatively connected to the reductant metering device, and, adapted to effect flow of reductant into the exhaust gas feedstream. The method includes determining a preferred dosing ratio based upon parameters of the exhaust gas feedstream and the catalytic reactor device, and adjusting the preferred dosing ratio. A preferred reductant feed rate is determined, and the reductant is selectively dispensed at the preferred reductant feed rate.

25 Claims, 3 Drawing Sheets

METHOD AND APPARATUS TO CONTROL INJECTION OF A REDUCTANT INTO AN EXHAUST GAS FEEDSTREAM

TECHNICAL FIELD

This invention pertains generally to exhaust aftertreatment systems for internal combustion engines, and a method and apparatus to inject a reductant upstream thereto.

BACKGROUND OF THE INVENTION

Manufacturers of internal combustion engines develop engine control strategies to satisfy customer demands and meet various regulations for emissions and fuel economy. One such engine control strategy comprises operating an engine at an air/fuel ratio that is lean of stoichiometry to improve fuel economy and reduce greenhouse gas emissions. Such operation is possible using compression-ignition (diesel) and lean-burn spark-ignition engines. When an engine operates with lean (excess oxygen) air/fuel ratio, the resultant combustion temperature is lower, leading to decreased engine-out $NO_x$ emissions; However, commercial application of lean-operating engines is limited due to lack of effective methods to remove $NO_x$ under a lean exhaust condition. Thus, efficient reduction of nitrogen oxides ($NO_x$=$NO$+$NO_2$) from diesel and lean-burn gasoline exhaust is important to meet future emission standards and improve vehicle fuel economy.

Reduction of $NO_x$ emissions from an exhaust feedstream containing excess oxygen is a challenge for vehicle manufacturers. By way of example, it is estimated that compliance with Bin 5 regulations in the United States may require an aftertreatment system capable of 70-90% $NO_x$ conversion efficiency on the FTP (Federal Test Procedure) cycle based on currently anticipated engine-out $NO_x$ levels. For practical application, the conversion efficiency must be obtained at a low temperature operating range (e.g., 200-350° C.) occurring during the aforementioned FTP cycle and at a higher temperature operating range (e.g., 450-550° C.) occurring during a high speed test cycle (e.g., US06 federal test procedure).

Several potential aftertreatment systems have been proposed for vehicle applications. One approach comprises using an aftertreatment system including injecting a $NO_x$ reductant, e.g., urea, upstream of a urea-SCR catalyst, to reduce $NO_x$ to $N_2$. Use of urea as a reductant necessitates a urea distribution infrastructure and an on-vehicle monitoring system for this secondary fluid, and may have potential problems in cold weather climates due to the relatively high freezing point (−12° C.) of the urea solution. $NO_x$ storage catalysts typically require large catalyst volumes, large amounts of platinum-group metals and low sulfur fuel for efficient storage operation. Such systems require periodic catalyst regeneration involving fuel injection to generate high exhaust gas temperatures and injection of reductants to regenerate the storage material of the catalyst.

There is a need for an effective apparatus and method to introduce a hydrocarbon reductant into an exhaust gas feedstream over a broad range of operating conditions, for use on vehicles and other applications of internal combustion engines.

SUMMARY OF THE INVENTION

In accordance with an embodiment of the invention, there is provided a method and apparatus to control injection of a reductant into the exhaust gas feedstream of an internal combustion engine adapted to operate in a lean air/fuel ratio region upstream of a catalytic reactor device. A control module is operatively connected to the reductant metering device, and, adapted to effect flow of reductant into the exhaust gas feedstream. The method includes determining a preferred dosing ratio based upon parameters of the exhaust gas feedstream and the catalytic reactor device, and adjusting the preferred dosing ratio. A preferred reductant feed rate is determined, and the reductant is selectively dispensed at the preferred reductant feed rate.

This and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, embodiments of which are described in detail and illustrated in the accompanying drawings which form a part hereof, and wherein.

DETAILED DESCRIPTION OF AN EMBODIMENT OF THE INVENTION

Figure 1:
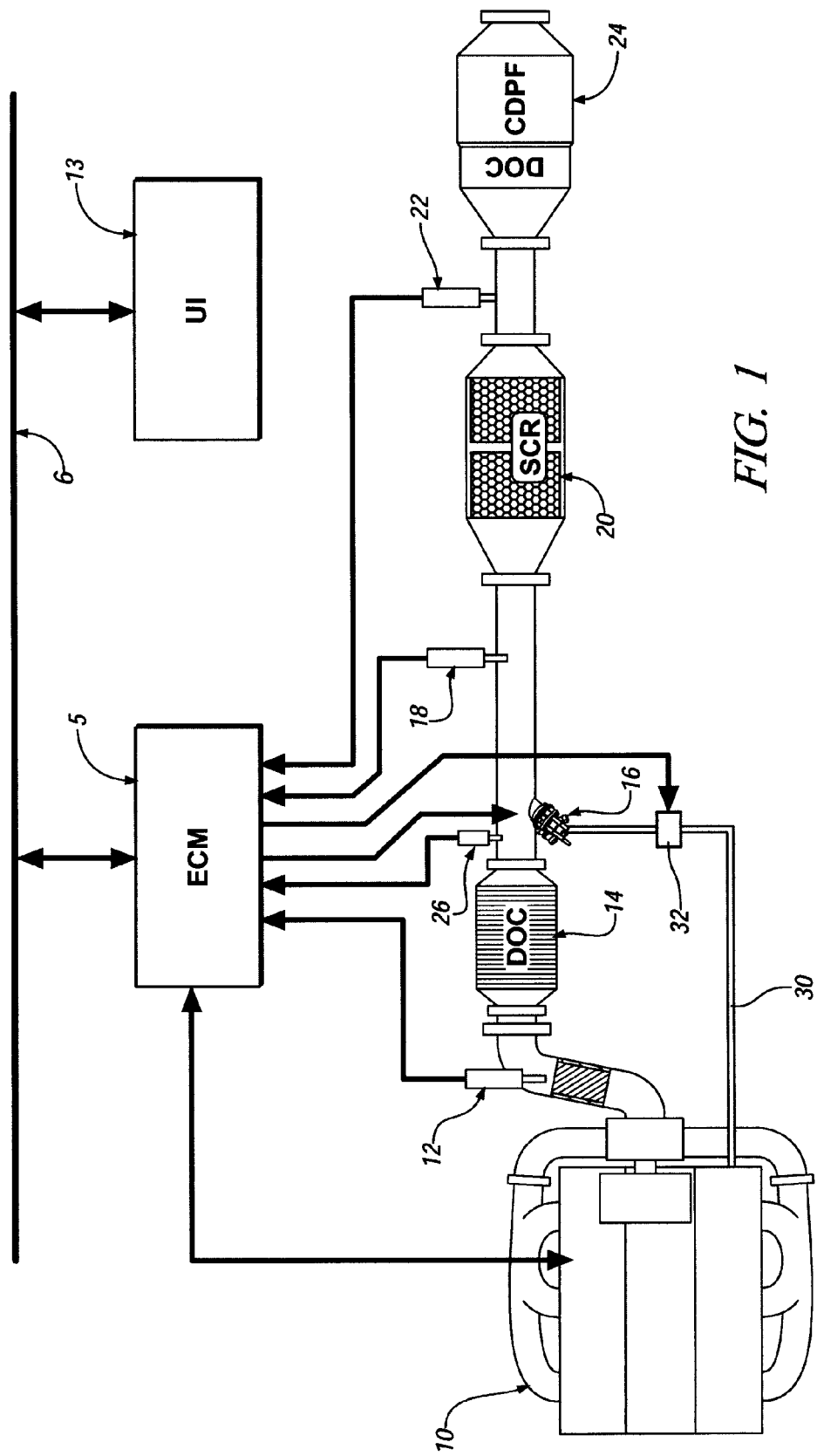
FIG. 1 is a schematic diagram of a powertrain system, in accordance with the present invention; and, FIGS. 2 and 3 are logic flow diagrams, in accordance with the present invention.

Referring now to the drawings, wherein the depictions are for the purpose of illustrating the invention only and not for the purpose of limiting the same, FIG. 1 depicts a schematic diagram of an internal combustion engine, exhaust aftertreatment system, and control system which has been constructed in accordance with embodiments of the present invention.

The exemplary engine and control system comprises a conventional four-cycle internal combustion engine 10 and electronic engine control module ('ECM') 5. The exemplary engine comprises a known compression-ignition engine having an operating regime that is primarily lean of stoichiometry. Alternatively, the engine 10 may comprise an engine employing any one of a number of engine control strategies which operate lean of stoichiometry, e.g., homogeneous-charge compression-ignition engines, and lean-burn spark-ignition engines. The engine 10 includes a plurality of reciprocating pistons attached to a crankshaft, which is operably attached to a vehicle driveline to deliver tractive torque thereto. The engine generates an exhaust gas feedstream comprising regulated constituent elements, typically including hydrocarbons ('HC'), carbon monoxide ('CO'), nitrides of oxygen ('NOx'), and particulate matter ('PM'), among others. The regulated constituent elements are partially or completely converted to harmless gases in the exhaust aftertreatment system through such processes as oxidation and reduction.

The exhaust aftertreatment system comprises an integrated system acting to convert constituent elements of the exhaust gas feedstream to harmless gases. An exhaust manifold entrains and directs engine exhaust gases to the exhaust aftertreatment system. The exemplary aftertreatment system includes catalytic reactor devices comprising an oxidation catalyst ('DOC') 14, a hydrocarbon selective-catalyst-reduction ('SCR') catalyst 20, and a final catalyst 24 comprising a second oxidation catalyst ('DOC') combined with a catalyzed diesel particulate filter ('CDPF'). Each of the catalytic reactor devices comprises a device which employs technologies having various capabilities for processing the constituent elements of the exhaust gas feedstream, including oxidation, reduction, reductant dosing, and particulate filtering. The devices are preferably fluidly connected in series using known pipes and connectors. The arrangement and utilization of the specific catalytic reactor devices described with reference to FIG. 1 are meant to be illustrative and not restricting to a specific design and layout.

The SCR device 20 comprises a catalytic reactor device operative to selectively reduce a substantial portion of $NO_x$ gases in the exhaust to inert nitrogen gas in the presence of a hydrocarbon reductant. For illustrative purposes, one SCR device 20 uses silver alumina ("AgAl") as catalytic material, and comprises a pre-selected weight percent of $Ag_2O$ supported on an alumina washcoat. An exemplary range of catalytic material is 2 to 4 wt. % AgAl, with a washcoat loading in a range 2 to 3 $g/in^3$ supported on a 400 cell per square inch cordierite monolith substrate. The SCR device 20 may, alternatively, utilize one of several known catalytic materials and washcoats having a range of loadings and supported on a substrate device. It is understood that the specifics of the catalyst are meant to be illustrative only, to demonstrate the system and control strategy described herein.

The aftertreatment system includes sensing devices and systems preferably signally connected to the ECM 5. The sensing devices preferably include a NOx sensor 12, a temperature sensor 26, and a second exhaust gas sensing device 22. The $NO_x$ sensor 12 is operative to monitor exhaust gases exiting the engine (as shown), or alternatively can be placed downstream of the DOC device 14. The temperature sensor 26 is operative to monitor temperature of exhaust gases exiting the DOC device 14 upstream of the SCR device 20, or alternatively, the sensor can be placed in the bed of the SCR device 20, in either case to determine an operating temperature ('$T_{EXH}$') of the SCR device 20. The exhaust gas sensing device 22 comprises a second sensor, shown operative to monitor constituent elements of exhaust gases after the SCR catalyst 20, the output of which is useable for control and diagnostics. The $NO_x$ sensor 12 preferably comprises a sensor operative to generate an electrical signal correlatable to a parametric value for $NO_x$ concentration in the exhaust gas feedstream, typically measured in parts per million ("ppm"), and further operative to generate a second electrical signal correlatable to a parametric value for air/fuel ratio of the exhaust gas feedstream, from which exhaust gas oxygen content ('O2') can be determined. Alternatively the $NO_x$ sensor 12 may comprise a virtual $NO_x$ sensing device, comprising an algorithm resident in the control module operative to determine parametric values for $NO_x$ and O2 based upon engine operating conditions. The exhaust gas sensing device 22 can comprise a $NO_x$ sensor operative to generate an electrical signal correlatable to a parametric value for $NO_x$ concentration in the exhaust gas feedstream after the SCR device 20. Alternatively, the exhaust gas sensing device 22 can comprise a hydrocarbon sensor operative to generate an electrical signal correlatable to a parametric value for HC concentration in the exhaust gas feedstream after the catalytic device 20, for use in a feedback control scheme described herein. Alternatively, the exhaust gas sensing device 22 can comprise an oxygen sensor ('O2') operative to generate an electrical signal correlatable to a parametric value for O2 concentration in the exhaust gas feedstream after the catalytic reactor device 20, for use in a feedback control scheme described herein. Other sensors 18 may be deployed in the aftertreatment system upstream of the SCR device 20 as needed. In one embodiment of the invention, sensor 18 can comprise an oxygen sensor useable for diagnostics and feedback control in conjunction with sensor 22.

The control system preferably comprises a distributed control module architecture including ECM 5. The control system preferably comprises a plurality of control modules adapted to provide coordinated control of the various vehicle systems including the powertrain system described herein. The control system is operable to monitor inputs from sensing devices (e.g., sensors 12, 18, 22, 26) synthesize pertinent information, and execute algorithms to control various actuators (e.g., 16, 32) to achieve control targets, including such parameters as fuel economy, emissions, performance, driveability, and protection of hardware. The distributed control module architecture includes ECM 5, and User Interface ('UI') 13 which is operably connected to a plurality of other devices through which a vehicle operator typically controls or directs operation of the vehicle and powertrain. Exemplary devices through which a vehicle operator provides input to the UI 13 include an accelerator pedal, a brake pedal, transmission gear selector, and, vehicle speed cruise control. Each of the aforementioned controllers and devices communicate with other controllers, devices, sensors, and actuators via a high-speed local area network ('LAN') bus, depicted generally as item 6. The LAN bus 6 allows for structured communication of control parameters and commands between the various processors, control modules, and devices. The specific communication protocol utilized is application-specific. The LAN bus and appropriate protocols provide for robust messaging and multi-controller interfacing between the aforementioned controllers, and other controllers providing functionality such as antilock brakes, traction control, and vehicle stability. The ECM 5 comprises a central processing unit signally electrically connected to volatile and non-volatile memory devices via data buses. The ECM 5 is operably attached to sensing devices and other output devices to ongoingly monitor and control operation of the engine 10 and exhaust system, as depicted. The output devices preferably include subsystems necessary for proper control and operation of the engine, including, by way of example, an air intake system, a fuel injection system, an exhaust gas recirculation system, and an evaporative control system. The engine sensing devices include devices operable to monitor engine operation and external conditions, and are typically signally attached to the ECM 5 via wiring harnesses. Algorithms stored in the non-volatile memory devices are executed by the central processing unit and are operable to monitor inputs from the sensing devices and execute engine control and diagnostic routines to control operation of the engine and the exhaust aftertreatment devices using preset calibrations. Algorithms are typically executed during preset loop cycles, with each control algorithm executed at least once each loop cycle. Loop cycles are typically executed each 3.125, 6.25, 12.5, 25 and 100 milliseconds during engine operation. Alternatively, control algorithms may be executed in response to occurrence of an event. A cyclical event, e.g., calculation of engine fueling, may be executed each engine cycle. A diagnostic algorithm may be executed once per engine key-on cycle. A diagnostic algorithm may have further limitations including requirements for achieving specific enablement criteria before execution. One skilled in the art is able to generally understand use of the ECM 5 to control and diagnose operation of various aspects of the internal combustion engine 10.

Referring again to FIG. 1, the apparatus to inject hydrocarbon reductant into the exhaust gas feedstream of the exemplary internal combustion engine upstream of one of the catalytic devices is shown. Such injection preferably occurs during lean operation of the internal combustion engine 5, or under other appropriate operating conditions. An exemplary reductant injection device 16 to dispense hydrocarbon reductant comprises a fuel injector adapted to inject reductant into the exhaust gas feedstream and fluidly connected to a controllable pressure regulating device 32 which receives pressurized fuel from a fuel line of the engine. The ECM 5 is operatively connected to the reductant injection device 16 and the controllable pressure regulating device 32, and controls flow of reductant into the exhaust gas feedstream, over a controllable flow range. The hydrocarbon reductant preferably comprises hydrocarbon fuel. The exhaust system includes sensing devices, e.g., sensors 12, 18, 22, and 26, operative to monitor parameters of the exhaust gas feedstream from which the ECM 5 is able to determine parameters of exhaust gas temperature, flow rate and emissions. The reductant injection device 16 and the controllable pressure regulator device 32 each are operatively connected to the ECM 5, which controls mass flow of reductant into the exhaust gas feedstream by controlling the regulator 32 to control fuel pressure and controlling injector opening pulsewidth and rate of repetition to control mass of fuel flow out of the reductant injection device 16, as described herein, with reference to FIGS. 2 and 3.

Figure 2:
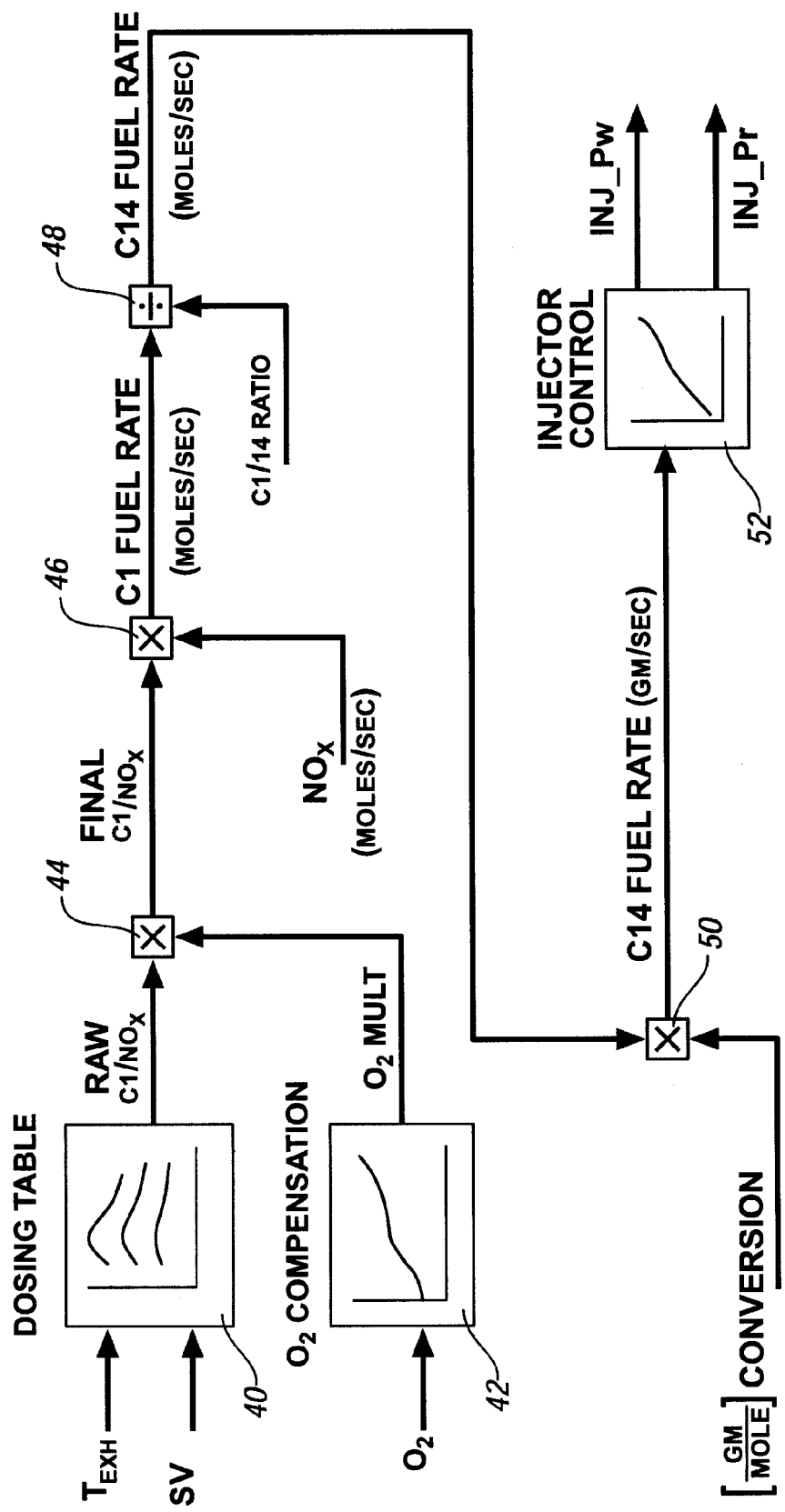

Referring now to FIG. 2, a feed-forward control scheme for controlling HC injection into the exhaust aftertreatment system described hereinabove is detailed. The control scheme is preferably executed as one or more algorithms in the ECM 5. Exhaust gas temperature, $T_{EXH}$, measured using temperature sensor 26, and space velocity ('SV') are determined. Catalyst space velocity is determined based upon displaced volume of the substrate(s) of the catalyst reactor and flow rate of the exhaust gas feedstream. Space velocity represents a rate of feed of exhaust gas, in volume, per unit volume of the catalyst, and has a unit of inverse hour ($h^{-1}$). These values comprise inputs to a dosing table 40, from which can be retrieved a preferred $C_1/NO_x$ ratio ('raw $C_1/NO_x$ ratio'). The dosing table comprises a calibration table, stored in tabular form in one of the non-volatile memory devices of ECM 5, comprising a plurality of parametric values for optimized $C_1/NO_x$ ratios determined over a range of exhaust gas temperatures $T_{EXH}$ and a range of catalyst space velocity parameters SV for the specific application. In a further refinement of the invention, the parametric values for optimized $C_1/NO_x$ ratios of the dosing table can be updated during regular operation of the engine based upon engine operating conditions and feedback from one or more of the exhaust gas sensors. The updated parametric values for optimized $C_1/NO_x$ ratios can take the form of a second calibration table of the same size as the dosing table wherein a specific value in the second calibration table is combined with a corresponding specific value of the dosing table to determine the optimized or raw $C_1/NO_x$ ratio.

The optimized raw $C_1/NO_x$ ratio is a ratio of fuel carbon to nitrides of oxygen to add to the exhaust gas feedstream to achieve peak NOx reduction and minimum HC slip past the HC—SCR catalyst 20. A measure of oxygen concentration ('$O_2$') in the exhaust gas feedstream is determined, preferably using signal output from sensor 12, and input to an $O_2$ compensation table 42. The measure of oxygen concentration preferably comprises a parametric measure of $O_2$ ranging from about 21% to less than 2%. The $O_2$ compensation table 42 comprises a plurality of predetermined $O_2$ multipliers ('O2 MULT') ranging from 1.0 to less than 0.5, that are correlated over the $O_2$ concentration range. An $O_2$ multiplier is determined for the measured $O_2$ concentration, and is multiplied by the raw $C_1/NO_x$ ratio (at 44) to achieve a final $C_1/NO_x$ ratio. A measure of $NO_x$ in the exhaust gas feedstream is determined using sensor 12, converted to units of moles per second, and multiplied by the final $C_1/NO_x$ ratio (at 46) to determine a $C_1$ fuel rate (moles/sec). The $C_1$ fuel rate is divided by a HC/fuel ratio (at 48), to achieve a C14 fuel rate (moles/sec). In this embodiment, the HC/fuel ratio comprises a $C_1/C_{14}$ fuel ratio, indicative of the hydrocarbon ratio for diesel fuel. The $C_{14}$ fuel rate, in moles per second, is multiplied by a gram/mole ('gm/mole') conversion factor (at 50) to determine a $C_{14}$ fuel rate in grams/second. By way of example, 1 ppm evaporated diesel fuel has approximately 14 carbon atoms; therefore, a $C_1/NO_x$ ratio of 10 with 100 ppm inlet $NO_x$ in the exhaust feedstream requires injection of 10×100/14=71 ppm diesel fuel. The $C_{14}$ fuel rate in input to an injector control module 52, to determine a preferred pulsewidth ('INJ_Pw') and a preferred pressure ('INJ_Pr') for operating the reductant injection device 16. The ECM 5 controls the reductant injection device 16 to inject hydrocarbon fuel into the exhaust gas feedstream to reduce $NO_x$ and minimize HC slip consistent with the preferred pulsewidth ('INJ_Pw') and preferred pressure ('INJ_Pr').

Figure 3:
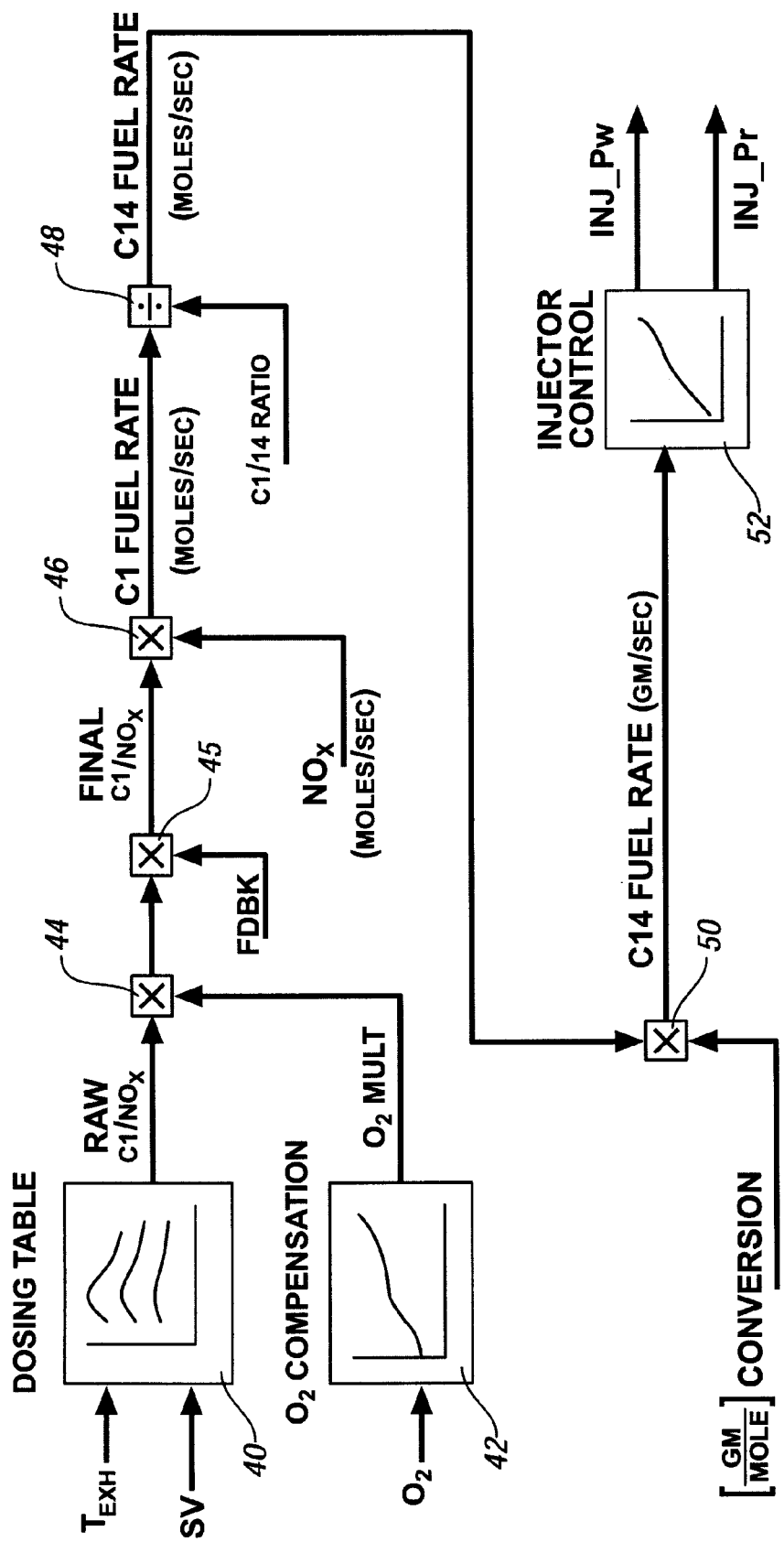

Referring now to FIG. 3, a control scheme comprising the feed-forward control and a feedback control is now described, to operate the engine and reductant injection system including the reductant injection device 16 and the pressure regulating device 32 based upon the preferred ratio for $C_1/NOx$ and the exhaust gas feedstream parameters. All aspects of the control scheme described with reference to FIG. 2 form a part of this embodiment, and are not described in detail. In this embodiment, feedback is obtained from the exhaust gas sensor 22 in the exhaust feedstream after the SCR catalyst 20, or alternatively, placed within the SCR 20 to monitor a portion thereof. The sensor feedback is used to adjust magnitude of the HC dosing. For example, when sensor 22 comprises the aforementioned oxygen sensor, low oxygen levels detected in the exhaust gas feedstream tend to lead to improved $NO_x$ efficiency. Therefore, as oxygen level in the exhaust gas feedstream drops, magnitude of HC injection can be reduced. A feedback factor is determined based upon the oxygen level, preferably ranging from 0.0 at low $O_2$ levels to 1.0 at high $O_2$ levels. The control scheme incorporates information from the sensor 22, by determining a feedback multiplier ('FDBK'), and multiplying the raw $C_1/NO_x$ ratio thereby (at 45) as part of the determination of the final $C_1/NO_x$ ratio. Similar strategies can be developed for feedback from sensor 22 when sensor 22 comprises either a $NO_x$ sensor or a hydrocarbon sensor. The control scheme executes thereafter as described with reference to FIG. 2 to control HC injection into the exhaust gas feedstream.

The embodiments described with reference to FIGS. 2 and 3 describe systems for optimizing $NO_x$ reduction through a HC—SCR catalyst device. It is understood that the control strategy can be adapted to inject a controlled quantity of hydrocarbon upstream of a catalytic device, e.g., the oxidation catalyst 14 shown herein, to effect desulfation thereof. Alternatively, the control strategy can be adapted to inject a controlled quantity of hydrocarbon upstream of the second oxidation catalyst 24, which includes the diesel particulate filter ('CDPF') 24, to effect regeneration thereof.

The control strategy described hereinabove with reference to the embodiments is applicable to control of post-combustion injection device for various compression-ignition engines and for spark-ignition engines. As described, such systems include post-combustion HC injection for regenerating diesel particulate filters, post-combustion HC injection for desulfation of diesel oxidation catalysts, and, post-combustion HC injection for regeneration and desulfation of lean-NOx catalysts.

The exhaust aftertreatment system for internal combustion engines adapted to operate in a lean air/fuel ratio region comprises the catalytic reactor device, a plurality of exhaust gas sensing devices, and the reductant injection system. The reductant injection system dispenses reductant into the exhaust gas feedstream upstream of the catalytic reactor device, and comprises the fluid metering device adapted to inject reductant into the exhaust gas feedstream and the controllable pressure regulating device. The control system determines parameters of the exhaust gas feedstream and a preferred reductant feed rate. The reductant injection system is controlled to the preferred reductant feed rate during lean operation. Use of such control permits optimization vehicle fuel economy while achieving maximum $NO_x$ reduction over the catalyst.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling injection of a hydrocarbon reductant into an exhaust gas feedstream of an internal combustion engine adapted to operate in a lean air/fuel ratio region upstream of a catalytic reactor device, comprising:
   determining a preferred dosing ratio based upon parameters of the exhaust gas feedstream and the catalytic reactor device;
   adjusting the preferred dosing ratio;
   determining a preferred hydrocarbon reductant feed rate based upon the preferred dosing ratio; and,
   selectively dispensing the hydrocarbon reductant at the preferred hydrocarbon reductant feed rate.

2. The method of claim 1, wherein determining the preferred dosing ratio comprises selecting one of a plurality of predetermined parametric values for $C_1/NO_x$ ratio to optimize $NO_x$ reduction in the catalytic reactor device based upon the parameters of the exhaust gas feedstream.

3. The method of claim 2, further comprising converting the $C_1/NO_x$ ratio to a hydrocarbon reductant feed rate based upon hydrocarbon content of the hydrocarbon reductant.

4. The method of claim 2, further comprising selectively updating the plurality of predetermined parametric values for $C_1/NO_x$ ratio.

5. The method of claim 1, further comprising:
   measuring a $NO_x$ concentration downstream the catalytic reactor, determining a space velocity based upon a volume of a substrate of the catalytic reactor and a flow rate of the exhaust gas feedstream, measuring an operating temperature of the catalytic reactor device, and determining the preferred dosing ratio based upon the measured $NO_x$ concentration, the determined space velocity and the measured operating temperature.

6. The method of claim 1, wherein adjusting the preferred dosing ratio comprises adjusting the preferred dosing ratio based upon oxygen content in the exhaust gas feedstream upstream of the catalytic reactor device.

7. The method of claim 6 comprising adjusting the preferred dosing ratio based upon the exhaust gas feedstream downstream of the catalytic reactor device.

8. The method of claim 7, wherein adjusting the preferred dosing ratio further comprises adjusting the preferred dosing ratio based upon oxygen content in the exhaust gas feedstream downstream of the catalytic reactor device.

9. The method of claim 7, wherein adjusting the preferred dosing ratio further comprises adjusting the preferred dosing ratio based upon hydrocarbon content in the exhaust gas feedstream downstream of the catalytic reactor device.

10. The method of claim 7, wherein adjusting the preferred dosing ratio further comprises adjusting the preferred dosing ratio based upon $NO_x$ content in the exhaust gas feedstream downstream of the catalytic reactor device.

11. The method of claim 6, wherein adjusting the preferred dosing ratio further comprises adjusting the preferred dosing ratio based upon the exhaust gas feedstream downstream a portion of the catalytic reactor device.

12. The method of claim 1, wherein selectively injecting the hydrocarbon reductant at the preferred hydrocarbon reductant feed rate comprises controlling a pressure and opening time of a reductant injection device.

13. Article of manufacture, comprising a computer program to control a fluid metering device adapted to inject a hydrocarbon reductant into an exhaust gas feedstream of an internal combustion engine adapted to operate in a lean air/fuel ratio region upstream of a catalytic reactor device, the program comprising: code to determine a preferred dosing ratio based upon parameters of the exhaust gas feedstream and the catalytic reactor device; code to adjust the preferred dosing ratio; code to determine a preferred hydrocarbon reductant feed rate based upon the preferred dosing ratio; and, code to selectively dispense the hydrocarbon reductant at the preferred hydrocarbon reductant feed rate.

14. The article of manufacture of claim 13, wherein the code to determine a preferred dosing ratio comprises code to select one of a plurality of $C_1/NO_x$ ratio parameters stored in tabular form based upon the parameters of the exhaust gas feedstream and the catalytic reactor device.

15. The article of manufacture of claim 14, further comprising code to selectively update the plurality of $C_1/NO_x$ ratio parameters stored in tabular form based upon the parameters of the exhaust gas feedstream and the catalytic reactor device.

16. Exhaust aftertreatment system for an internal combustion engine operative in a lean air/fuel ratio region, comprising:
   an oxidation catalyst catalytic reactor device;
   a hydrocarbon selective-catalyst reduction catalytic reactor device;
   a plurality of exhaust gas sensing devices;
   a hydrocarbon reductant injection system operative to dispense a hydrocarbon reductant into the exhaust gas feedstream upstream of the hydrocarbon selective-catalyst reduction catalytic reactor device and downstream of the oxidation catalyst catalytic reactor device;
   and, a control system to:
   i) determine a preferred dosing ratio based upon parameters of the exhaust gas feedstream and the catalytic reactor device;
   ii) adjust the preferred dosing ratio;
   iii) determine a preferred hydrocarbon reductant feed rate based upon the preferred dosing ratio; and,
   iv) selectively control the hydrocarbon reductant injection system to dispense the hydrocarbon reductant at the preferred hydrocarbon reductant feed rate.

17. The exhaust aftertreatment system of claim 16, wherein the hydrocarbon reductant injection system comprises:
   a hydrocarbon reductant injection device adapted to inject the hydrocarbon reductant into the exhaust gas feedstream, and,
   a controllable pressure regulating device.

18. The exhaust aftertreatment system of claim 16, wherein the control system adapted to determine a preferred dosing ratio comprises the control system adapted to select one of a plurality of dosing ratios contained in tabular form in the control system.

19. The exhaust aftertreatment system of claim 18, wherein the control system is adapted to selectively update the plurality of dosing ratios contained in tabular form in the control system.

20. The exhaust aftertreatment system of claim 19, wherein each of the dosing ratios comprises a predetermined parametric value for $C_1/NO_x$ ratio to optimize $NO_x$ reduction in the catalytic reactor device.

21. The exhaust aftertreatment system of claim 16, wherein the exhaust gas sensing devices comprise an oxygen sensing device downstream of the catalytic reactor device, and the control system adapted to determine oxygen content in the exhaust gas feedstream thereat, and adapted to adjust the preferred dosing ratio based thereupon.

22. The exhaust aftertreatment system of claim 16, further comprising:
  the catalytic reactor device comprising a hydrocarbon selective catalyst reduction device; and,
  the preferred hydrocarbon reductant feed rate comprising a hydrocarbon $NO_x$ ratio effective to reduce $NO_x$ through the hydrocarbon selective catalyst reduction device.

23. The exhaust aftertreatment system of claim 16, further comprising:
  the catalytic reactor device comprising a diesel particulate filter device; and,
  the preferred hydrocarbon reductant feed rate effective to regenerate the diesel particulate filter device.

24. The exhaust aftertreatment system of claim 16, further comprising:
  the catalytic reactor device comprising a diesel oxidation catalytic device; and,
  the preferred hydrocarbon reductant feed rate effective to desulfate the diesel oxidation catalytic device.

25. The exhaust aftertreatment system of claim 16, wherein the internal combustion engine comprises a homogeneous-charge compression-ignition engine.

* * * * *